(12) United States Patent
Daoud

(10) Patent No.: US 6,289,160 B1
(45) Date of Patent: Sep. 11, 2001

(54) FIBER-OPTIC CABLE ROUTING AND STORAGE DEVICE

(75) Inventor: Bassel Hage Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,018

(22) Filed: Sep. 7, 1999

(51) Int. Cl.⁷ .................................................... G02B 6/00
(52) U.S. Cl. ........................... 385/135; 385/136; 385/137
(58) Field of Search ................................. 385/134, 135, 385/136, 137

(56) References Cited

U.S. PATENT DOCUMENTS

| | | | |
|---|---|---|---|
| 5,142,661 | * | 8/1992 | Grant et al. ........................... 385/135 |
| 5,647,045 | * | 7/1997 | Robinson et al. .................... 385/135 |
| 5,781,686 | * | 7/1998 | Robinson et al. .................... 385/135 |
| 5,922,997 | * | 7/1999 | Lecinski ............................... 174/135 |

* cited by examiner

Primary Examiner—Hemang Sanghavi
Assistant Examiner—Jennifer Doan
(74) Attorney, Agent, or Firm—Stroock & Stroock & Lavan LLP

(57) ABSTRACT

A fiber-optic cable routing and storage device that can be used to accommodate the slack of various different lengths of fiber-optic cable and that includes a fiber-optic cable routing path that ensures a minimum bend radius for the routed cable.

25 Claims, 6 Drawing Sheets

FIBER-OPTIC CABLE ROUTING AND STORAGE DEVICE

FIELD OF THE INVENTION

The present invention relates to fiber-optic cable routers and guides and, more particularly, to a fiber-optic cable routing and storage device that prevents excessive bending of the fiber-optic cable and which provides flexibility in defining a fiber-optic cable routing path for cables of various lengths.

BACKGROUND OF THE INVENTION

It is often necessary to splice already-installed fiber-optic cables to provide for connection to a different end-point. Such fiber-to-fiber splices require removal of a section of the fiber cable so that the spliced end(s) may be properly prepared. This, in turn, changes the length (i.e., shortens) of the cable. Since fiber-optic cables are typically installed with a certain amount of slack in the cable, splicing changes the amount of slack that must be accommodated. Following a splice it thus becomes necessary to accommodate a different length of fiber cable. In addition, a minimum radius must be provided to prevent damage to the fiber-optic cable.

There thus exists a need in the art for a fiber-optic routing and storage device that provides flixibility in accommodating fiber-optic cable slack and that also ensures the minimum bend radius for the cable.

SUMMARY OF THE INVENTION

The present invention is directed to a fiber-optic cable routing and storage device that can be used to accommodate the slack of various different lengths of fiber-optic cable and that includes a fiber-optic cable routing path that ensures a minimum bend radius for the routed cable.

The present invention is directed to a fiber-optic cable routing and storage device comprising a fiber-optic cable router that defines at least a part of a fiber-optic cable routing path over which a fiber-optic cable may be routed and which limits bending of the fiber-optic cable to less than a predetermined amount. The routing and storage device also includes a selectively deflectible mount for movably securing the cable router to a tray, with the cable router being selectively movable on and along the tray. The routing and storage device further includes a plurality of guides disposed along the cable routing path for preventing movement of the fiber-optic cable off of the cable routing path.

The present invention is also directed to a fiber-optic cable routing and bend limiting system comprising a plurality of fiber-optic cable routers each including a selectively deflectible mount for movably securing each of the plurality of cable routers to a tray. Each of the plurality of cable routers is selectively and separately movable on and along the tray. The plurality of cable routers each defines a generally arcuate part of a fiber-optic cable routing path over which a fiber-optic cable may be routed and which limits bending of the fiber-optic cable to less than a predetermined amount. The cable routing path is defined in part by the relative position of each of the plurality of cable routers with respect to each other on the tray.

The present invention is further directed to a fiber-optic cable routing and bend limiting system comprising a first fiber-optic cable router including a selectively deflectible mount for movably securing said first cable router to a tray. The first cable router is selectively movable on and along the tray. The system also includes a second fiber-optic cable router including a selectively deflectible mount for movably securing the second cable router to the tray. The second cable router is selectively movable on and along the tray. The first and second cable routers each define a generally arcuate part of a fiber-optic cable routing path over which a fiber-optic cable may be routed and which limits bending of the fiber-optic cable to less than a predetermined amount. The cable routing path is defined in part by the relative position of the first and second cable routers with respect to each other on the tray.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a fiber-optic cable routing and storage device that can be used to accommodate the slack of various different lengths of fiber-optic cable and that includes a fiber-optic cable routing path that ensures a minimum bend radius for the routed cable.

Figure 1:
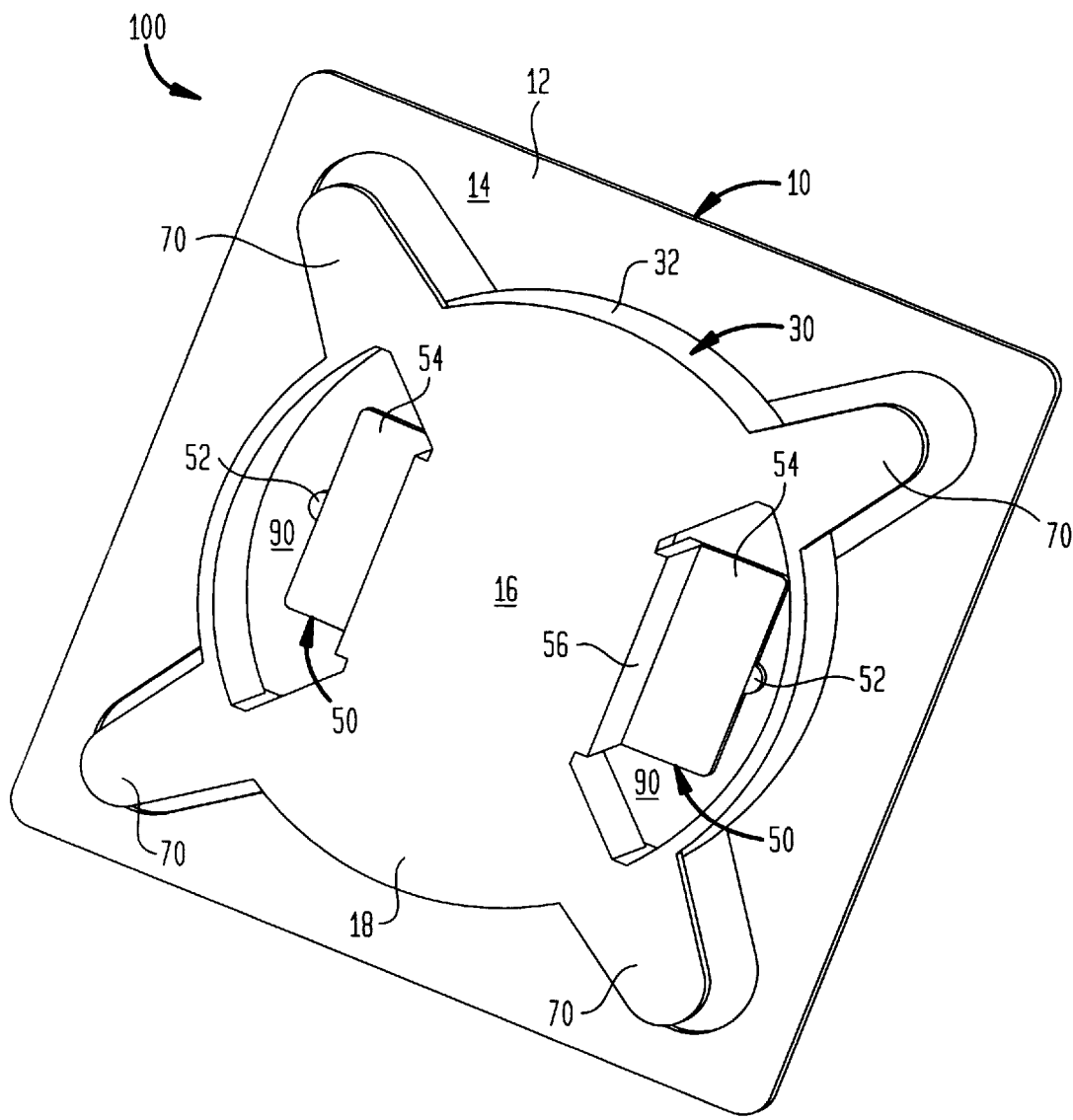
FIG. 1 is a top perspective view of a fiber-optic cable routing and storage device constructed in accordance with an embodiment of the present invention.
Figure 2:
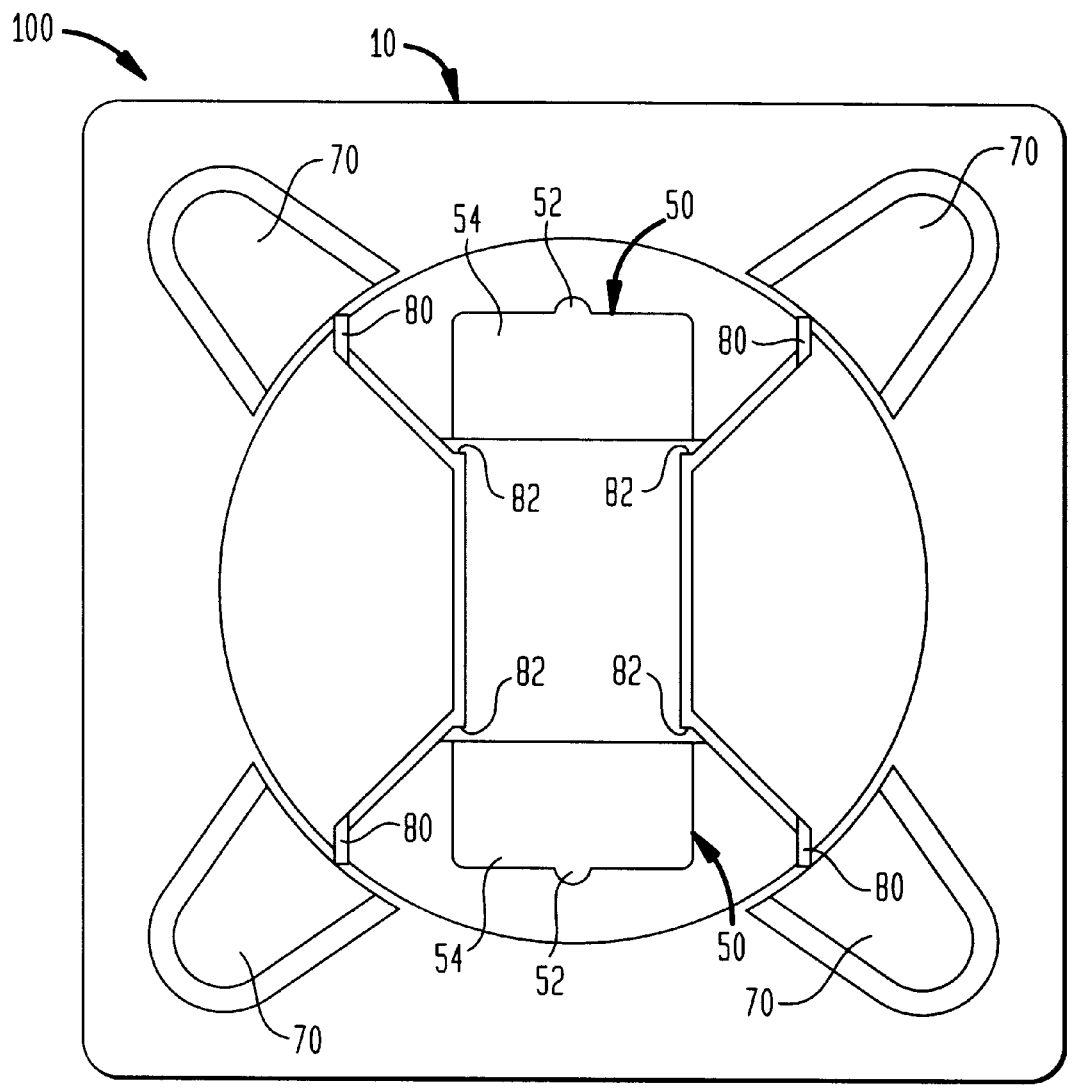
FIG. 2 is a bottom view of the cable routing and storage device of FIG. 1.

Referring now to the drawings in detail, FIGS. 1 and 2 depict an embodiment of a cable routing and storage device 100 constructed in accordance with the present invention. The device 100 comprises a router 10 having a generally square base 12 and a platform 18 defined by a top surface 16 and a generally circular routing surface 32 extending generally upward from the base 12 and which also defines a generally arcuate part of a fiber-optic cable routing path 30. The routing surface 32 may comprises a part of the routing path 30, or it may comprise the entire routing path 30, depending upon the specific application and use of the router 10 of the present invention. The base has a top surface 14 that defines a first plane from which the routing surface 32 originates. The platform top surface 16 defines a second plane that is vertically spaced apart from the plane of the base top surface 14 and generally parallel therewith and at which the routing surface 32 terminates. Cable guides 70 extend outward from the routing surface 32 and are substantially co-planar with the platform top surface 16. Four guides 70 are depicted in FIG. 1, although more or less guides 70 may be provided in accordance with the present invention. The shape of the guides 70 is also a routine matter of design choice, as long as that the guides 70 prevent movement of a fiber-optic cable 20 (see, e.g., FIG. 5) off of the routing surface 32, i.e., off of the cable routing path 30. The guides 70 and base top surface 14 also serve to define the cable routing path 30 by defining lateral boundaries thereof.

The router 10 is mountable in a fiber tray 40 (see, e.g., FIG. 5) such as, for example, model number FOCS 400 D5 manufactured by Raychem. The router 10 incudes two mounts 50 located opposite each other to secure the router 10 in the tray 40. The mounts 50 each include a base 54 which extends generally perpendicularly outward from a wall 56 extending generally downward from the platform top surface 16. A tab 52 extends outward from each base 54 and is sized and shaped to releasably engage a complementarily sized and shaped feature defined in the fiber tray 40. The mounts 50 are each individually deflectable by applying pressure to the wall 56 in a direction generally transverse thereto and deflecting the mounts 50 generally toward each other. Access to the mounts 50 is via openings 90 defined through the platform top surface 16, as described in more detail below. Two stops 82 are provided (see, e.g., FIG. 2) for each mount 50 to limit the defelction thereof and to prevent damage to the mounts 50 due to excessive deflection during insertion, removal, and movement of the router 10 in a fiber tray 40.

When the router 10 is installed in a fiber tray 40, it is secured therein against pivotal movement by a plurality of stabilizers 80 that contactingly engage the fiber tray 40 and that are located on a bottom side of the router 10 (see, e.g., FIG. 2).

Figure 3:
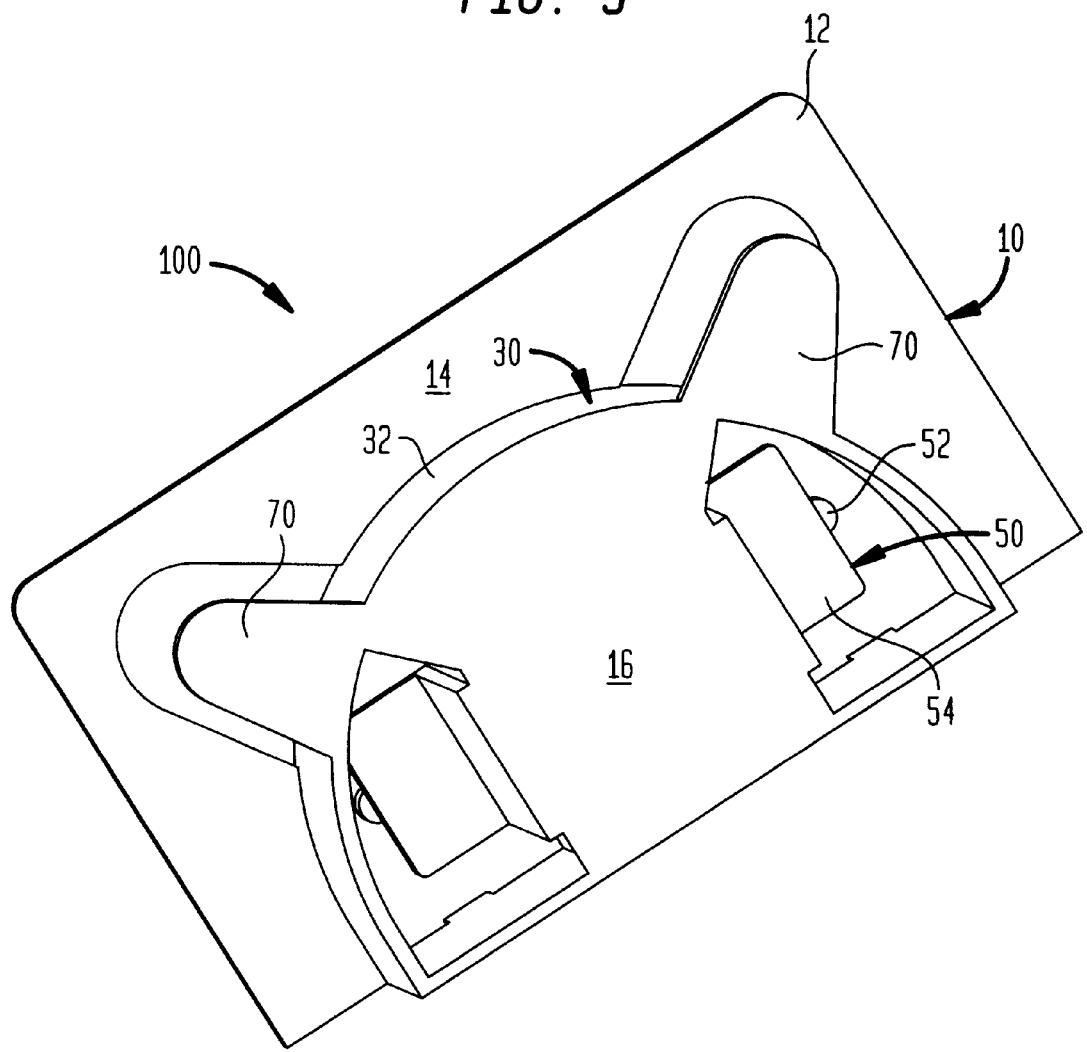
FIG. 3 is a top perspective view of a fiber-optic cable routing and storage device constructed in accordance with another embodiment of the present invention.
Figure 4:
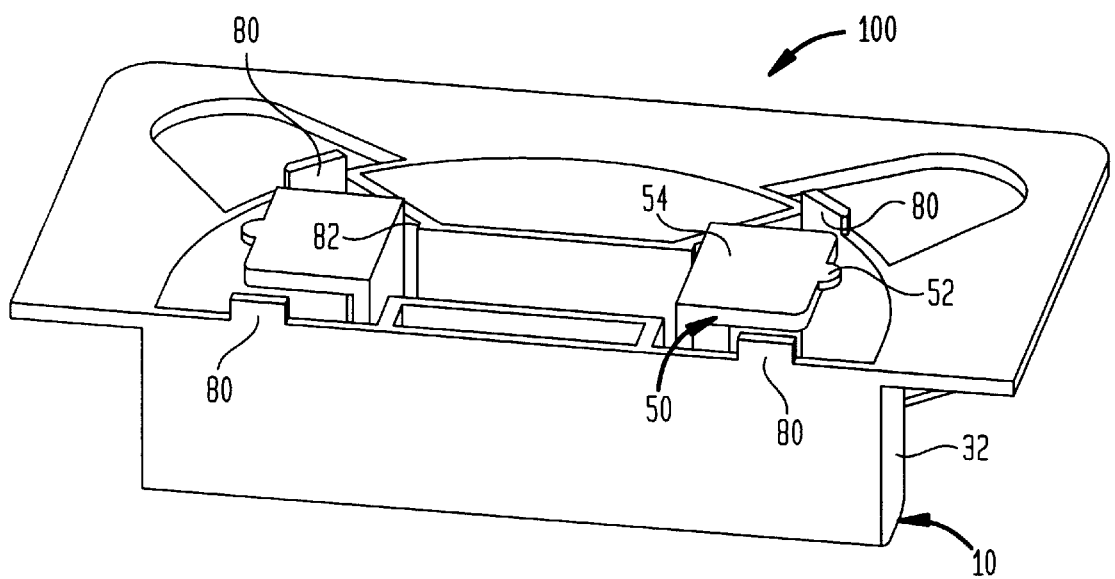
FIG. 4 is a bottom perspective view of the fiber-optic cable routing and storage device of FIG. 3.

Another embodiment of a fiber-optic cable routing and storage device 100 constructed in accordance with the present invention is depicted in FIGS. 3 and 4. In this embodiment, the routing surface 32 is generally semi circular and also defines a generally arcuate part of the cable routing path 30, which may be semi-circular (i.e., the routing surface 32 comprises the routing path 30) or some other shape. In this embodiment, stabilizers 80 are also provided on a bottom side of the router to prevent rotational movement of the router 10 when installed in a fiber tray 40.

Figure 5:
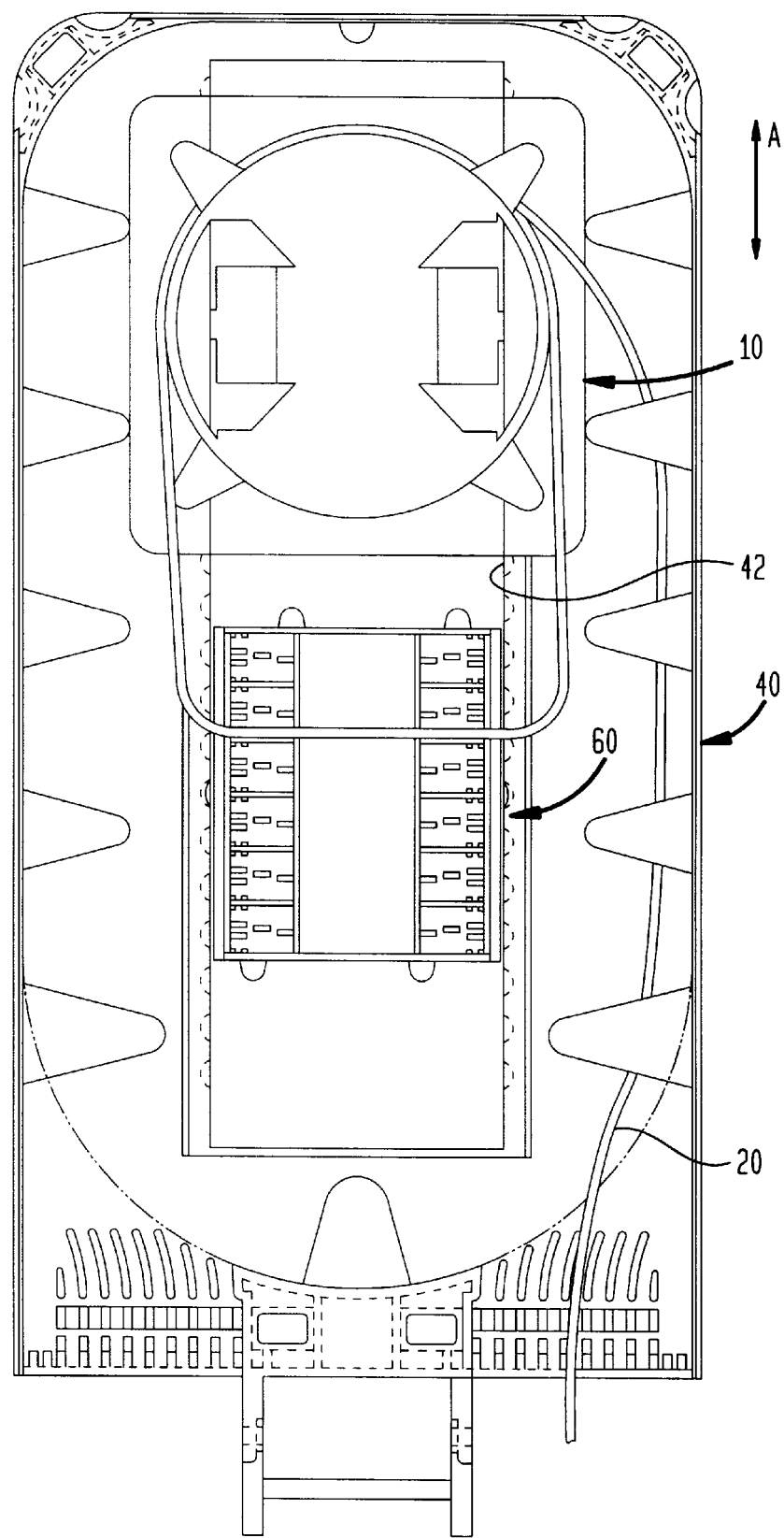
FIG. 5 is a top view of a fiber tray having a cable routing and storage device constructed in accordance with an embodiment of the present invention.

Referring next to FIG. 5, operation of the cable routing and storage device 100 of the present invention will now be discussed in detail. One or more routers 10 may be removably held by a tray 40 that is adapted to secure a plurality of fiber-optic cables 20, to provide routing for the cables 20, and to protect the cables 20 from damage. The tray 40 is typically deployed in a fiber-optic network where a plurality of cable splices are located (i.e., typically, as part of outside plant equipment). At such locations, it is desirable to provide excess fiber-optic cable, i.e. to provide slack so that future splices may be made without concern for whether sufficient fiber-optic cable is provided to make such splices. Thus, the tray 40, and more specifically, the router 10 of the present invention, provide a fiber-optic cable routing and storage device that can be adjusted to accommodate varying lengths of fiber-optic cable.

For example, a single router 10 installed in a fiber tray 40 as decpited in FIG. 5 may be selectively moved on and along the tray 40 in the direction indicated by arrow A. It is thus possible to change the length of the cable routing path 30 by changing the location of the router 10 on the tray 40. The part of the routing path 30 defined by the routing surface 32 of the router 10 of this emodiment is generally semi-circular. The fiber-optic cable 20 may be routed along the routing path 30, along the routing surface 32, and between the first surface 14 and guides 70, which together prevent the cable 20 from moving off of the routing path 30.

In a preferred embodiment, the tray 40 will include a plurality of detents 42 defined along parallel tracks the run longitudinally along the length of the tray 40. The tabs 52 provided on the mounts 50 of the router 10 and the detents 42 are complementarily sized and shaped. The mounts 50 are deflectable in a direction generally toward each other (i.e., in a direction generally transverse to the wall 56) by application of a squeezing-type pressure applied to the walls 56 such as, for example, by a thumb and forefinger, with access to the mounts 50 being through the openings 90. The router 10 may thus be seletively positioned on the tray 40, and may be moved, as needed, on and along the tray 40.

Figure 6:
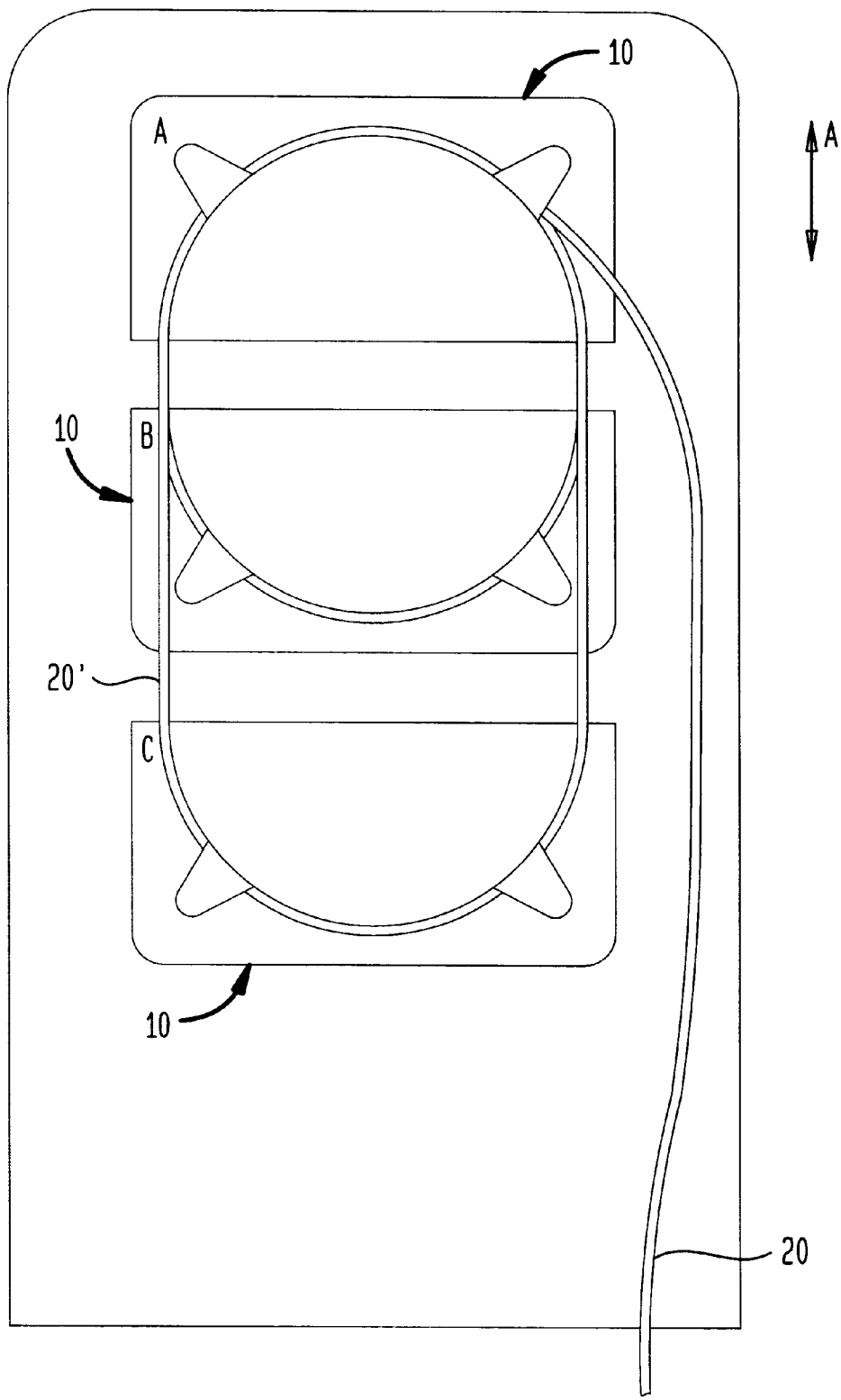
FIG. 6 is a top view of a fiber tray having a plurality of cable routing and storage devices constructed in accordance with another embodiment of the present invention.

In another embodiment of the present invention, depicted in FIG. 6, a plurality of routers 10 may be provided on a single tray 40. Each router 10 is individually movable on and along the tray 40 to collectivley define the cable routing path 30. In this embodiment, it is possible to define a circular routing path, such as between routers A and B, an oblong routing path, such as between routers A and C, a figure-eight shaped routing path, and various other shapes and configurations based on the relative positions of the routers 10. It is also possible to define a pluarlity of routing paths 30. For example, a first fiber-optic cable 20 may be routed along a path 30 defined by routers A and B. S second cable 20' may be routed along a path defined by routers A and C.

The generally arcuate part of the routing path 30 defined by the routing surface 32 in each of the various embodiments described herein limits bending of the fiber-optic cable 20 to prevent damage thereto. Preferably, the routing surface 32 provides a bend radius of approximately ¼ inch to the fiber-optic cable 20 as it passes thereover.

It will be obvious to persons skilled in the art that the routers 10 of the present invention may be provided on a finer tray 40 in virtually any combination (i.e. of circular and semi-circular) to provide for routing paths having a variety of shapes and configurations. The embodiments and examples described herein are provided as illustrative, non-limiting examples of the present invention and are not intended to limit the scope or spirit of the present invention.

Thus, while there have been shown and described and pointed out fundamental novel features of the invention as applied to preferred embodiments thereof it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable routing and storage device comprising:
   a fiber-optic cable router defining at least a part of a fiber-optic cable routing path over which a fiber-optic cable is routable and which limits bending of the fiber-optic cable to less than a predetermined amount;
   a selectively deflectable mount for movably securing said cable router to a tray, said cable router being selectively movable on and along the tray; and
   a plurality of guides disposed along said cable routing path for preventing movement of the fiber-optic cable off of said part of said cable routing path.

2. A fiber-optic cable routing and storage device as recited by claim 1, wherein said fiber-optic cable router further comprises a base and a routing surface extending generally upward from said base and which defines a generally arcuate part of said routing path, said plurality of guides extend from said routing surface at a location remote from said base.

3. A fiber-optic cable routing and storage device as recited by claim 2, wherein each of said plurality of guides comprises a tab that extends generally perpendicularly from said routing surface.

4. A fiber-optic cable routing and storage device as recited by claim 2, wherein said generally arcuate part is generally circular.

5. A fiber-optic cable routing and storage device as recited by claim 2, wherein said generally arcuate part is generally semi-circular.

6. A fiber-optic cable routing and storage device as recited by claim 2, further comprising a stabilizer located on said base for limiting rotational movement of said cable router with respect to the tray.

7. A fiber-optic cable routing and storage device as recited by claim 2, further comprising a surface extending from said routing surface at a location remote from said base and having openings defined therethrough and which provide access to said mount.

8. A fiber-optic cable routing and storage device as recited by claim 1, wherein said mount further comprises a movement limiting part and wherein the tray includes a part complimentarily sized and shaped with said movement limiting part and wherein releasable engagement of said movement limiting part and the tray part prevents movement of said cable router on and along the tray.

9. A fiber-optic cable routing and storage device as recited by claim 8, wherein said movement limiting feature comprises a tab extending from said mount and wherein the tray feature comprises a detent within which said tab may be releasably seated.

10. A fiber-optic cable routing and bend limiting system comprising a plurality of fiber-optic cable routers each including a selectively deflectable mount for movably securing each of said plurality of cable routers to a tray, each of said plurality of cable routers being selectively and separately movable on and along the tray, said plurality of cable routers each defining a generally arcuate part of a fiber-optic cable routing path over which a fiber-optic cable may be routed and which limits bending of the fiber-optic cable to less than a predetermined amount, said cable routing path being defined in part by the relative position of each of said plurality of cable routers with respect to each other on the tray.

11. A fiber-optic cable routing and bend limiting system as recited by claim 10 comprising two fiber-optic cable routers each having a routing surface defined thereon, each said routing surface defining a generally semi-circular part of said routing path.

12. A fiber-optic cable routing and bend limiting system as recited by claim 10 comprising two fiber-optic cable routers each having a routing surface defined thereon, wherein said routing surface defined on at least on of said routers defines a generally semi-circular part of said routing path.

13. A fiber-optic cable routing and bend limiting system as recited by claim 10 comprising three fiber-optic cable routers each having a routing surface defined thereon, each said routing surface defining a generally semi-circular part of said routing path.

14. A fiber-optic cable routing and bend limiting system as recited by claim 10 comprising three fiber-optic cable routers each having a routing surface defined thereon, wherein said routing surface defined on at least on of said routers defines a generally semi-circular part of said routing path.

15. A fiber-optic cable routing and bend limiting system as recited by claim 10, wherein each of said plurality of cable routers includes a guide disposed along said cable routing path for preventing movement os a fiber-optic cable off of said cable routing path.

16. A fiber-optic cable routing and bend limiting system comprising:
a first fiber-optic cable router including a selectively deflectable mount for movably securing said first cable router to a tray, said first cable router being selectively movable on and along the tray; and
a second fiber-optic cable router including a selectively deflectible mount for movably securing said second cable router to the tray, said second cable router being selectively movable on and along the tray;
said first and said second cable routers each defining a generally arcuate part of a fiber-optic cable routing path over which a fiber-optic cable may be routed and which limits bending of the fiber-optic cable to less than a predetermined amount, said cable routing path being defined in part by the relative position of said first and said second cable routers with respect to each other on the tray.

17. A fiber-optic cable routing and bend limiting system as recited by claim 16, wherein said first and said second cable routers each include a guide disposed along said cable routing path for guiding the fiber-optic cable along said cable routing path.

18. A fiber-optic cable routing and bend limiting system as recited by claim 16, wherein each of said first and said second cable routers comprises a base and routing surface extending generally upward from each said base and wherein each said guide extends generally perpendicularly from said respective routing surface and in spaced apart relation to said base.

19. A fiber-optic cable routing and bend limiting system as recited by claim 16, wherein each said generally arcuate part of said fiber-optic cable routing path defined by said first and said second cable routers defines a generally semi-circular part of said cable routing path.

20. A fiber-optic cable routing and bend limiting system as recited by claim 16, further comprising:
a third fiber-optic cable router including a selectively deflectible mount for movably securing said third cable router to the tray, said third cable router being selectively movable on and along the tray;
said first, said second, and said third cable routers each defining a generally arcuate part of said fiber-optic cable routing path, said cable routing path being defined in part by the relative position of said first, said second, and said third cable routers with respect to each other on the tray.

21. A fiber-optic cable routing and bend limiting system as recited by claim 20, wherein each of said first, said second, and said third cable routers includes a guide disposed along said cable routing path for preventing movement of a fiber-optic cable off of said cable routing path.

22. A fiber-optic cable routing and bend limiting system as recited by claim 16, wherein each of said first and said second cable routers includes a guide disposed along said cable routing path for preventing movement of a fiber-optic cable off of said cable routing path.

23. A fiber-optic cable routing and bend limiting system as recited by claim 16, wherein said cable routing path is generally circular.

24. A fiber-optic cable routing and bend limiting system as recited by claim 16, wherein said cable routing path is generally oblong.

25. A fiber-optic cable routing and bend limiting system as recited by claim 16, wherein said cable routing path forms a figure-eight shape.

* * * * *